(12) United States Patent
Chang et al.

(10) Patent No.: US 9,260,807 B2
(45) Date of Patent: Feb. 16, 2016

(54) APPARATUS AND METHOD FOR FABRICATING THREE-DIMENSIONAL NONWOVEN FABRIC STRUCTURE

(75) Inventors: Kung-Chin Chang, Tu-Chen (TW); Chao-Chun Peng, Tu-Chen (TW); Ming-Chih Kuo, Tu-Chen (TW); Cheng-Kun Chu, Tu-Chen (TW)

(73) Assignee: TAIWAN TEXTILE RESEARCH INSTITUTE, Tu-Chen, Taipei Hsien (TW)

( * ) Notice: Subject to any disclaimer, the term of this patent is extended or adjusted under 35 U.S.C. 154(b) by 180 days.

(21) Appl. No.: 13/041,510

(22) Filed: Mar. 7, 2011

(65) Prior Publication Data

US 2012/0025410 A1 Feb. 2, 2012

(30) Foreign Application Priority Data

Jul. 30, 2010 (TW) .............................. 99125441 A

(51) Int. Cl.
| | | |
|---|---|---|
| *B29C 41/04* | (2006.01) | |
| *D04H 1/56* | (2006.01) | |
| *D01D 5/098* | (2006.01) | |
| *D04H 3/07* | (2012.01) | |
| *D04H 3/16* | (2006.01) | |
| *D01D 7/00* | (2006.01) | |
| *D01F 13/00* | (2006.01) | |

(52) U.S. Cl.
CPC .............. *D04H 1/56* (2013.01); *D01D 5/0985* (2013.01); *D01D 7/00* (2013.01); *D01F 13/00* (2013.01); *D04H 3/07* (2013.01); *D04H 3/16* (2013.01)

(58) Field of Classification Search
CPC ........ B29C 41/04; B29C 41/042; B29C 41/06
USPC .................................................. 425/217, 72.2
See application file for complete search history.

(56) References Cited

U.S. PATENT DOCUMENTS

| | | | | |
|---|---|---|---|---|
| 3,922,126 A | * | 11/1975 | Seaver et al. ................ | 425/72.2 |
| 4,145,388 A | | 3/1979 | Off et al. | |
| 5,554,394 A | * | 9/1996 | Feal et al. .................... | 425/434 |

(Continued)

FOREIGN PATENT DOCUMENTS

| | | |
|---|---|---|
| CN | 1240006 A | 12/1999 |
| CN | 1240379 A | 1/2000 |

(Continued)

OTHER PUBLICATIONS

English translation of abstract of CN 1608155 A (published Apr. 20, 2005).

(Continued)

*Primary Examiner* — Christina Johnson
*Assistant Examiner* — Xue Liu
(74) *Attorney, Agent, or Firm* — McClure, Qualey & Rodack, LLP

(57) ABSTRACT

An apparatus for fabricating three-dimensional nonwoven fabric structure is disclosed, which includes an adjustable frame, a three-dimensional mold, a rotary shaft connecting the three-dimensional mold and the adjustable frame, and a meltblown device. The three-dimensional mold is rotated relative to the adjustable frame. The meltblown device has plural nozzles for spinning a plurality of fibers, wherein the three-dimensional mold is rotated in front of the nozzles to select the fibers, and a three-dimensional nonwoven fabric structure is formed on the three-dimensional mold.

5 Claims, 6 Drawing Sheets

(56) References Cited

U.S. PATENT DOCUMENTS

| | | | |
|---|---|---|---|
| 5,733,581 A * | 3/1998 | Barboza et al. | 425/72.2 |
| 6,514,061 B1 * | 2/2003 | Hudson | 425/62 |
| 6,649,116 B2 * | 11/2003 | Stephenson et al. | 264/439 |
| 2003/0080051 A1 | 5/2003 | Aune et al. | |
| 2003/0207638 A1 | 11/2003 | Bowlin et al. | |
| 2006/0276095 A1 | 12/2006 | Dua et al. | |
| 2008/0081323 A1 | 4/2008 | Keeley et al. | |
| 2008/0150197 A1 * | 6/2008 | Chang et al. | 264/465 |

FOREIGN PATENT DOCUMENTS

| | | |
|---|---|---|
| CN | 1608155 A | 4/2005 |
| EP | 1967219 | 9/2008 |
| GB | 1383597 A | 2/1975 |
| GB | 2051160 | 1/1981 |
| TW | 587114 | 5/2004 |
| TW | 200827501 A | 7/2008 |
| WO | 95/05246 A1 | 2/1995 |
| WO | 02/32642 | 4/2002 |

OTHER PUBLICATIONS

English translation of abstract of CN 1240379 A (published Jan. 5, 2000).

English translation of abstract of CN 1240006 A (published Dec. 29, 1999).

English translation of abstract of TW 587114 (published May 11, 2004).

English translation of abstract of TW 200827501 A (published Jul. 1, 2008).

* cited by examiner

APPARATUS AND METHOD FOR FABRICATING THREE-DIMENSIONAL NONWOVEN FABRIC STRUCTURE

RELATED APPLICATIONS

This application claims priority to Taiwan Application Serial Number 99125441, filed Jul. 30, 2010, which is herein incorporated by reference.

BACKGROUND

1. Field of Invention

The present invention relates to an apparatus for fabricating three-dimensional nonwoven fabric structure. More particularly, the present invention relates to an apparatus for fabricating three-dimensional nonwoven fabric structure by using meltblown process.

2. Description of Related Art

With the rapid development of the textile industry, a variety of textiles have been utilized in our daily life. The conventional textiles, such as clothing, hats, socks, etc., need to be cut, sewn, or bonded while processing, therefore there must be some seams on the textiles and would spend much time.

A three-dimensional nonwoven fabric structure has been produced to provide a seamless product, but the thickness uniformity and the yield are difficult to improve.

For the forgoing reasons, there is a need for improving the thickness uniformity and the yield of the seamless three-dimensional nonwoven fabric structure.

SUMMARY

An aspect of the invention provides an apparatus for fabricating three-dimensional nonwoven fabric structure, which includes an adjustable frame, a three-dimensional mold, a rotary shaft connecting the three-dimensional mold and the adjustable frame, and a meltblown device. The three-dimensional mold is rotated relative to the adjustable frame. The meltblown device has plural nozzles for spinning a plurality of fibers, wherein the three-dimensional mold is rotated in front of the nozzles to select the fibers, and a three-dimensional nonwoven fabric structure is formed on the three-dimensional mold. Two largest widths of the three-dimensional mold at opposite sides of the rotary shaft are approximately the same. A density of the nozzles is determined by a shape of the three-dimensional mold. The apparatus for fabricating three-dimensional nonwoven fabric structure further includes a sub rotary shaft disposed near the three-dimensional mold for removing a superfluous part of the fibers. The apparatus for fabricating three-dimensional nonwoven fabric structure further includes a hot pressing device for hot pressing the three-dimensional nonwoven fabric structure.

Another aspect of the invention is an apparatus for fabricating three-dimensional nonwoven fabric structure, which includes a conveyer, a meltblown device, plural three-dimensional mold, and plural rotary shaft. The meltblown device has plural nozzles for spinning fibers. The rotary shafts connect the three-dimensional molds and the conveyer, thereby the three-dimensional molds are rotated on the conveyer. The three-dimensional molds are conveyed in front of the nozzles by the conveyer, then the fibers are selected on the three-dimensional molds rotated in front of the nozzles to form plural three-dimensional nonwoven fabric structures. Two largest widths of each of the three-dimensional molds at opposite sides of each of the rotary shafts are approximately the same. A density of the nozzles is determined by a shape of each of the three-dimensional molds. The apparatus for fabricating three-dimensional nonwoven fabric structure further includes a fiber recycling device disposed near the meltblown device to remove a superfluous part of the fibers. The apparatus for fabricating three-dimensional nonwoven fabric structure further includes a hot pressing device for hot pressing the three-dimensional nonwoven fabric structure.

Another aspect of the invention is a method for fabricating three-dimensional nonwoven fabric structure, which includes providing a three-dimensional mold, providing a meltblown device having plural nozzles for spinning fibers, rotating the three-dimensional mold in front of the nozzles to select the fibers, thereby a three-dimensional nonwoven fabric structure is formed on the three-dimensional mold, and hot pressing the three-dimensional nonwoven fabric structure. The three-dimensional mold is rotated along a first direction before the three-dimensional mold is conveyed in front of the meltblown device, and the three-dimensional mold is rotated along a second direction when the three-dimensional mold is conveyed in front of the meltblown device.

The three-dimensional mold is rotated in front of the spinner to collect the fibers spun from the meltblown device, and the three-dimensional nonwoven fabric structure is formed on the three-dimensional mold. The position and the height of the adjustable frame, the angle between the rotary shaft and the three-dimensional mold, the density of the nozzles, and the rotary speed of the three-dimensional mold are adjustable. The present invention has the sub rotary shaft or fiber collector to remove the superfluous part of the fibers. The thickness uniformity and the peel strength of the three-dimensional nonwoven fabric structure can be improved by using the apparatus for fabricating three-dimensional nonwoven fabric structure of the present invention.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
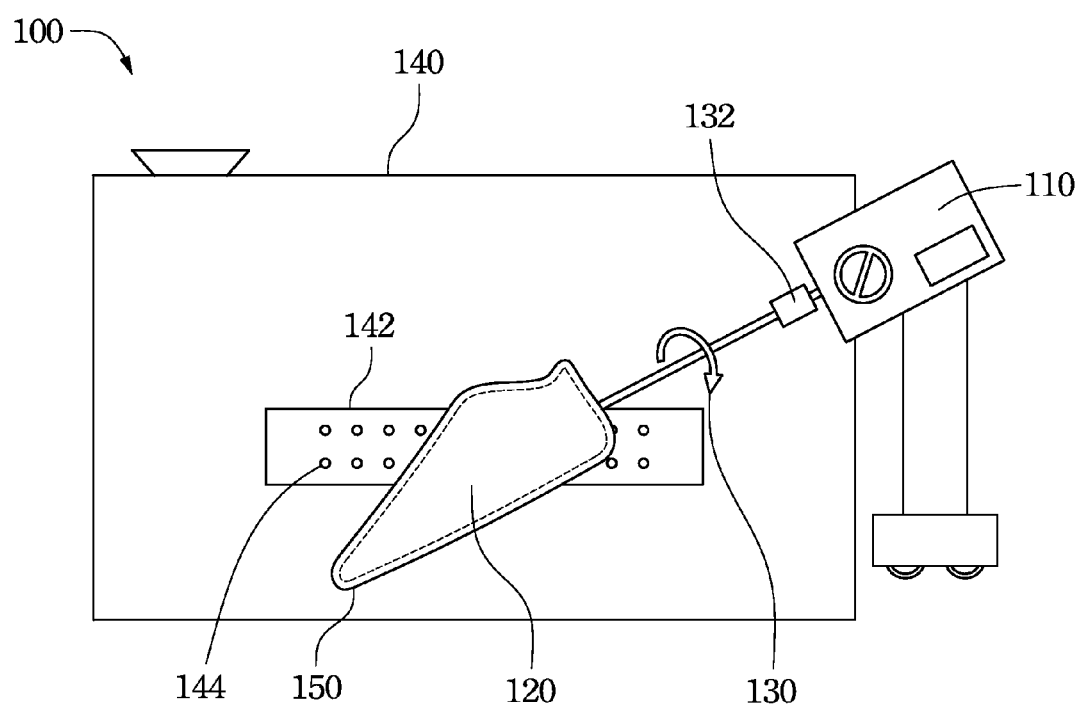
FIG. 1 is a schematic diagram of a first embodiment of the apparatus for fabricating three-dimensional nonwoven fabric structure of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of a first embodiment of the apparatus for fabricating three-dimensional nonwoven fabric structure of the invention. The apparatus for fabricating three-dimensional nonwoven fabric structure 100 includes an adjustable frame 110, a three-dimensional mold 120, a rotary shaft 130 for connecting the adjustable frame 110 and the three-dimensional mold 120, and a meltblown device 140. The shape of the three-dimensional mold 120 can be regular or irregular. The three-dimensional mold 120 is rotated relative to the adjustable frame 110 by the rotary shaft 130. The height and the slanting angle of the three-dimensional mold 120 can be adjusted by the adjustable frame 110. The meltblown device 140 would melt a plastic material and spin the plastic melt as fibers. A spinner 142 of the meltblown device 140 has a plurality of nozzles 144. The fibers are spun from the nozzles 144. The three-dimensional mold 120 is disposed in front of the spinner 142. The three-dimensional mold 120 is rotated in front of the spinner 142. The fibers are collected on the three-dimensional mold 120, and a three-dimensional nonwoven fabric structure 150 is formed on the three-dimensional mold 120.

The adjustable frame 110 can be used to adjust the height and the slanting angle of the three-dimensional mold 120. The adjustable frame 110 is movable to adjust the distance and the spinning angle between the three-dimensional mold 120 and the spinner 142. The three-dimensional mold 120 is rotated in front of the spinner 142 by the rotary shaft 130. The rotary shaft 130 includes a motor 132. The speed of the motor 132 can be adjusted to change the rotary speed of three-dimensional mold 120. A thickness of the one piece formed three-dimensional nonwoven fabric structure 150 can be more uniform by adjusting the height, the slanting angle, the rotary speed of the three-dimensional mold 120, and the distance and the spinning angle between the three-dimensional mold 120 and the spinner 142.

Figure 2:
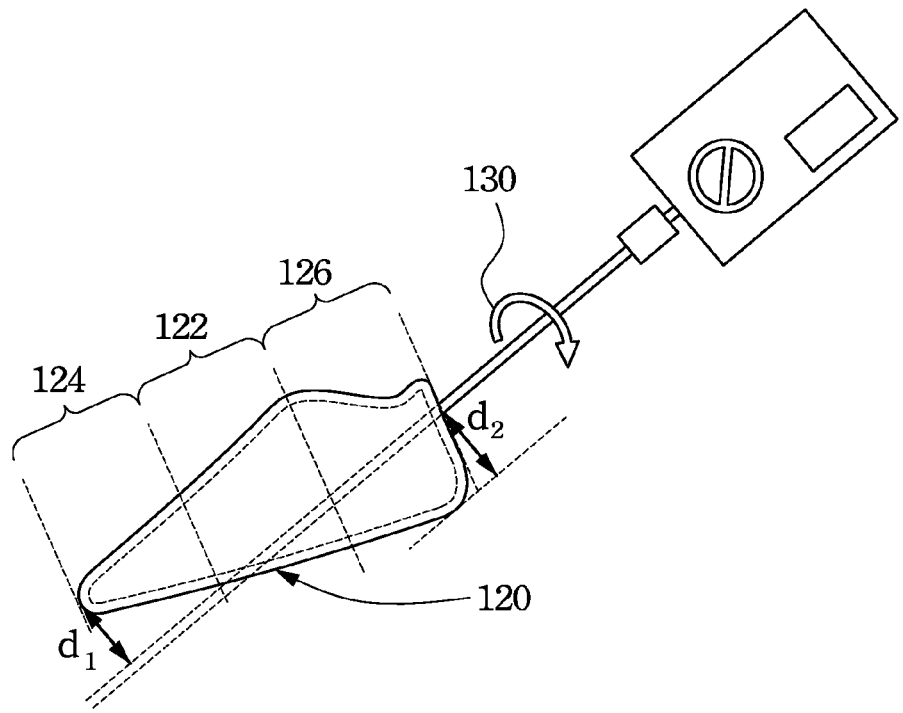
FIG. 2 is a schematic diagram of the relative position of the three-dimensional mold and the rotary shaft of the apparatus for fabricating three-dimensional nonwoven fabric structure of the invention.

FIG. 2 is a schematic diagram of the relative position of the three-dimensional mold and the rotary shaft of the apparatus for fabricating three-dimensional nonwoven fabric structure of the invention. The rotary shaft 130 can be set along a symmetry axis of the three-dimensional mold 120 if the shape of the three-dimensional mold 120 is regular and has the symmetry axis. However, the shape of the three-dimensional mold 120 could be irregular. The angle between the rotary shaft 130 and the three-dimensional mold 120 would determine the distance between the three-dimensional mold 120 and the spinner (see FIG. 1) and the thickness uniformity of the three-dimensional nonwoven fabric structure (see FIG. 1). Therefore a preferred rule for setting the rotary shaft is required in order to improve the thickness uniformity of the three-dimensional nonwoven fabric structure.

In this embodiment, for example, the three-dimensional mold 120 can be a shoe last mold, wherein the widths and the heights of a shoe body 122, a shoe toe 124, and a shoe heel 126 of the shoe last mold are different. The shoe last mold can be regarded as an irregular mold. The thickness uniformity would be better when the distance d1 from the shoe toe 124 to the rotary shaft 130 is the same as the distance d2 from the shoe heel 126 to the rotary shaft 130. Namely, the preferred rule for setting the rotary shaft 130 in the irregular mold is that the two largest widths of the three-dimensional mold 120 at opposite sides of the rotary shaft 130, such as the distance d1 and the distance d2 in this embodiment, are approximately the same.

Figure 3:
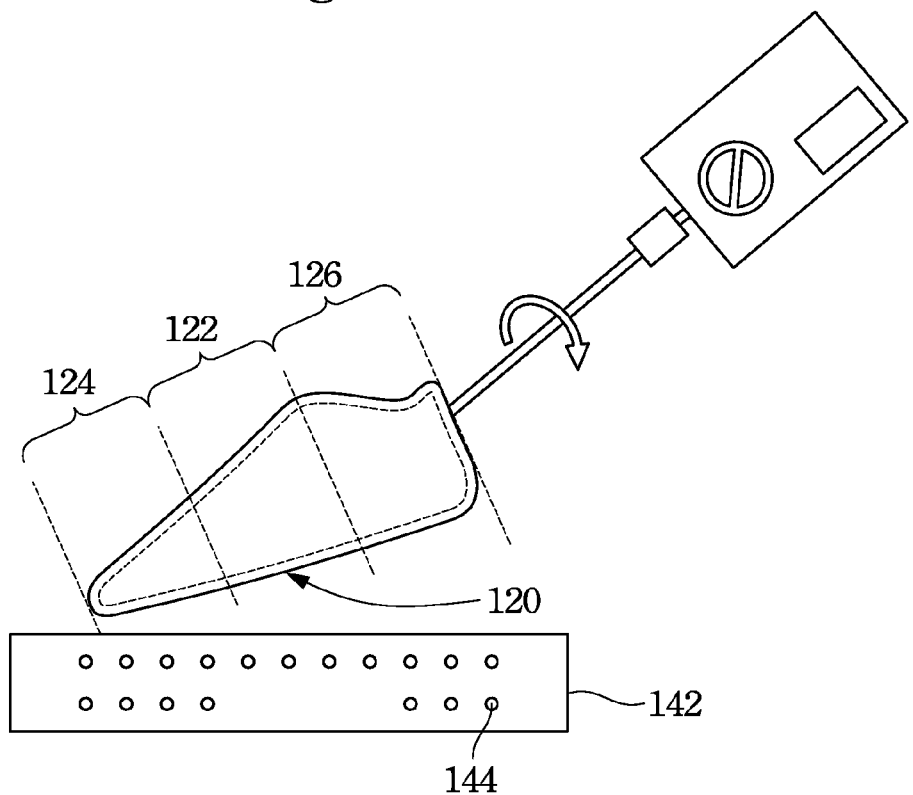
FIG. 3 is a schematic diagram of the relation between the density of the nozzles of the spinner and the three-dimensional mold of the apparatus for fabricating three-dimensional nonwoven fabric structure of the invention.

FIG. 3 is a schematic diagram of the relation between the density of the nozzles of the spinner and the three-dimensional mold of the apparatus for fabricating three-dimensional nonwoven fabric structure of the invention. As to the shoe last mold of the three-dimensional mold 120 disclosed above, the surface area of the shoe body 122 is larger than the surface area of the shoe toe 124 or the surface area of the shoe heel 126. The area of the shoe body 122 passing the spinner 142 would be larger than the area of the shoe toe 124 passing the spinner 142 or the area of the shoe heel 126 passing the spinner 142 in the same period while the three-dimensional mold 120 is rotated in front of the spinner 142. Namely, the time of the shoe body 122 collecting the fiber is longer than the time of the shoe toe 124 or the shoe heel 126 collecting the fibers.

In order to prevent that the thickness of fibers collected on the shoe body 122 is larger than the thickness of the fibers collected on the shoe toe 124 or the shoe heel 126, the density of the nozzles 144 can be adjusted according to the shape of the three-dimensional mold 120. More particularly, the number of nozzles 144 related to the shoe body 122, which may have larger fiber thickness, can be reduced to improve the thickness uniformity. Several blank tests can be applied to find at what position of the three-dimensional mold 120 might have the largest fiber thickness, and a part of the nozzles 144 related to the position can be blocked to improve the thickness uniformity of the product.

The distance between the nozzles 144 and the three-dimensional mold 120 is from 40 cm to 70 cm. The preferred distance between the nozzles 144 and the three-dimensional mold 120 is from 50 cm to 60 cm. The angle between the spinning direction of the fibers and the rotary shaft 130 for the three-dimensional mold 120 is from 0 degree to 180 degree. The preferred angle between the spinning direction of the fibers and the rotary shaft 130 for the three-dimensional mold 120 is from 80 degree to 100 degree, wherein 90 degree can be the general operation angle. The rotary speed of the three-dimensional mold 120 is from 200 rpm to 500 rpm, wherein the peel strength of the product is preferable when the rotary speed of the three-dimensional mold 120 is from 200 rpm to 250 rpm. The spinning time is decided by the desired thickness of the product.

Figure 4:
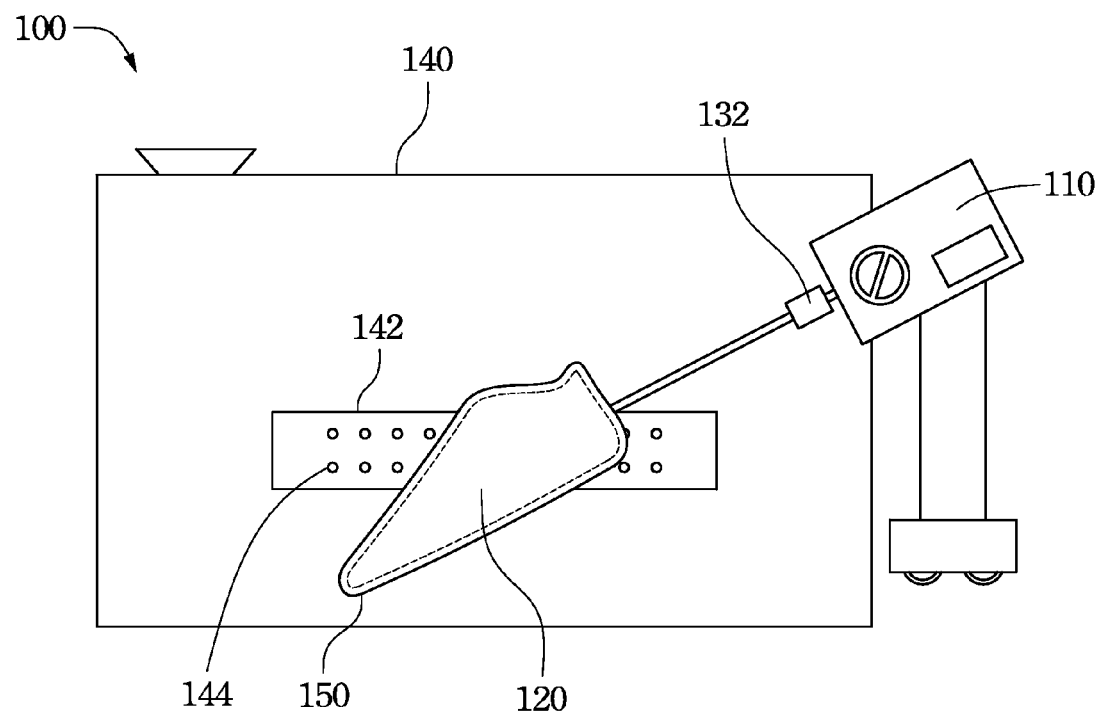
FIG. 4 is a schematic diagram of a second embodiment of the apparatus for fabricating three-dimensional nonwoven fabric structure of the invention.
Figure 4:
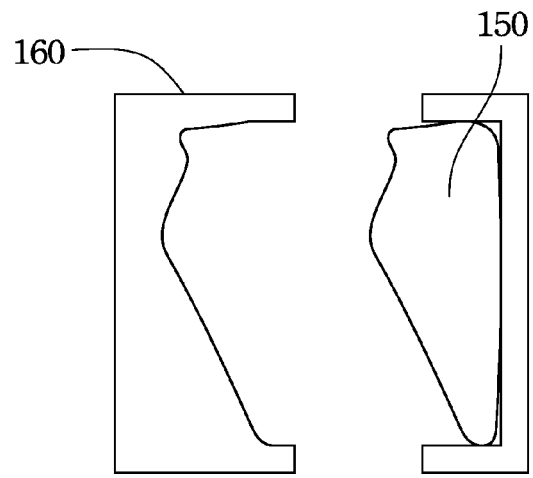

FIG. 4 is a schematic diagram of a second embodiment of the apparatus for fabricating three-dimensional nonwoven fabric structure of the invention. The apparatus for fabricating three-dimensional nonwoven fabric structure 100 includes the adjustable frame 110, the three-dimensional mold 120, the rotary shaft 130 for connecting the adjustable frame 110 and the three-dimensional mold 120, the meltblown device 140, and a hot pressing device 160. The fibers spun from the meltblown device 140 are collected on the three-dimensional mold 120, and the three-dimensional nonwoven fabric structure 150 is formed on the three-dimensional mold 120. The three-dimensional mold 120 and the three-dimensional nonwoven fabric structure 150 thereon are placed into the hot pressing device 160 and are hot pressed for further fixing the three-dimensional nonwoven fabric structure 150.

Figure 5:
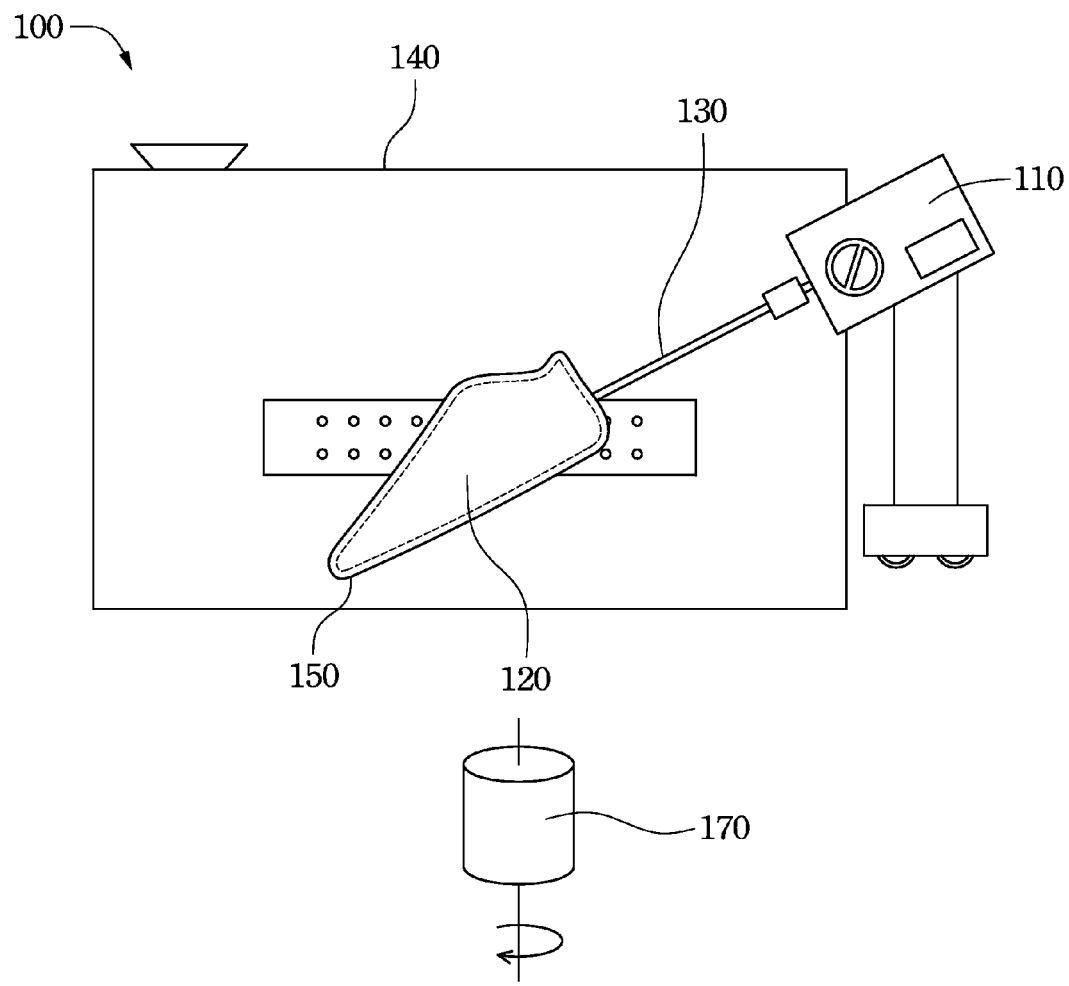
FIG. 5 is a schematic diagram of a third embodiment of the apparatus for fabricating three-dimensional nonwoven fabric structure of the invention.

FIG. 5 is a schematic diagram of a third embodiment of the apparatus for fabricating three-dimensional nonwoven fabric structure of the invention. The apparatus for fabricating three-dimensional nonwoven fabric structure 100 includes the adjustable frame 110, the three-dimensional mold 120, the rotary shaft 130 for connecting the adjustable frame 110 and the three-dimensional mold 120, the meltblown device 140, the hot pressing device 160, and a sub rotary shaft 170 disposed near the three-dimensional mold 120. The shape of the three-dimensional mold 120 might be irregular, thus some of the fibers may be spun over the three-dimensional mold 120 and are difficult to be collected by the three-dimensional mold 120. The superfluous part of the fibers that spun over the three-dimensional mold 120 can be lead toward and collected by the sub rotary shaft 170. The sub rotary shaft 170 collects and removes the superfluous part of the fibers to prevent that the superfluous part of the fibers surround but can not be collected by the three-dimensional mold 120 firmly. Therefore, the uniformity and the peel strength of the three-dimensional nonwoven structure 150 can be improved.

Figure 6:
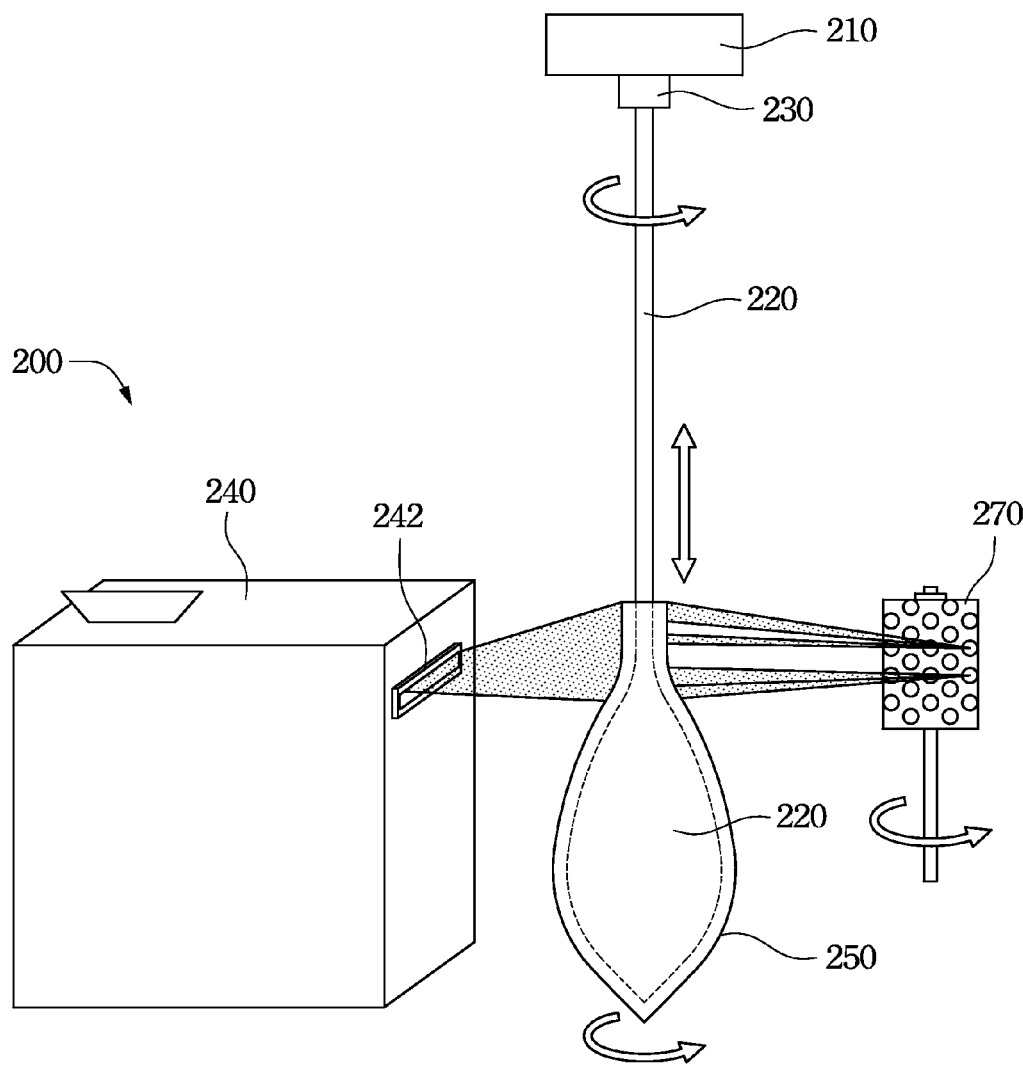
FIG. 6 is a schematic diagram of a fourth embodiment of the apparatus for fabricating three-dimensional nonwoven fabric structure of the invention.

FIG. 6 is a schematic diagram of a fourth embodiment of the apparatus for fabricating three-dimensional nonwoven fabric structure of the invention. The apparatus for fabricating three-dimensional nonwoven fabric structure 200 includes the adjustable frame 210, the three-dimensional mold 220, the rotary shaft 230 for connecting the adjustable frame 210 and the three-dimensional mold 220, the meltblown device 240 and the sub rotary shaft 270. The length of the three-dimensional mold 220 is larger than the width of the spinner 242 of the meltblown device 240.

The adjustable frame 210 can be moved related to the meltblown device 240, such that the rotating three dimensional mold 220 can be moved forward related to the spinner 242. The fibers spun by the meltblown device 240 can be collected by the three-dimensional mold 220, and the continuing three-dimensional nonwoven fabric structure 250 without seams is formed on the three-dimensional mold 220. The moving speed of the three-dimensional mold 220 can be determined according to the shape of the three-dimensional mold 220 for improving the thickness uniformity of the three-dimensional nonwoven fabric structure 250. For example, the section of the three-dimensional mold 220 having a larger diameter spends more time passing through the spinner 242 than the section of the three-dimensional mold 220 having a smaller diameter.

Similarly, the sub rotary shaft 270 can remove the superfluous part of the fibers spun through the spinner 242 when the section of the three-dimensional mold 220 having the smaller diameter passes through the spinner 242 to prevent fiber block due to the irregular shape of the three-dimensional mold 220. Thus the thickness uniformity and the peel strength of the three-dimensional nonwoven fabric structure 250 can be improved.

Figure 7:
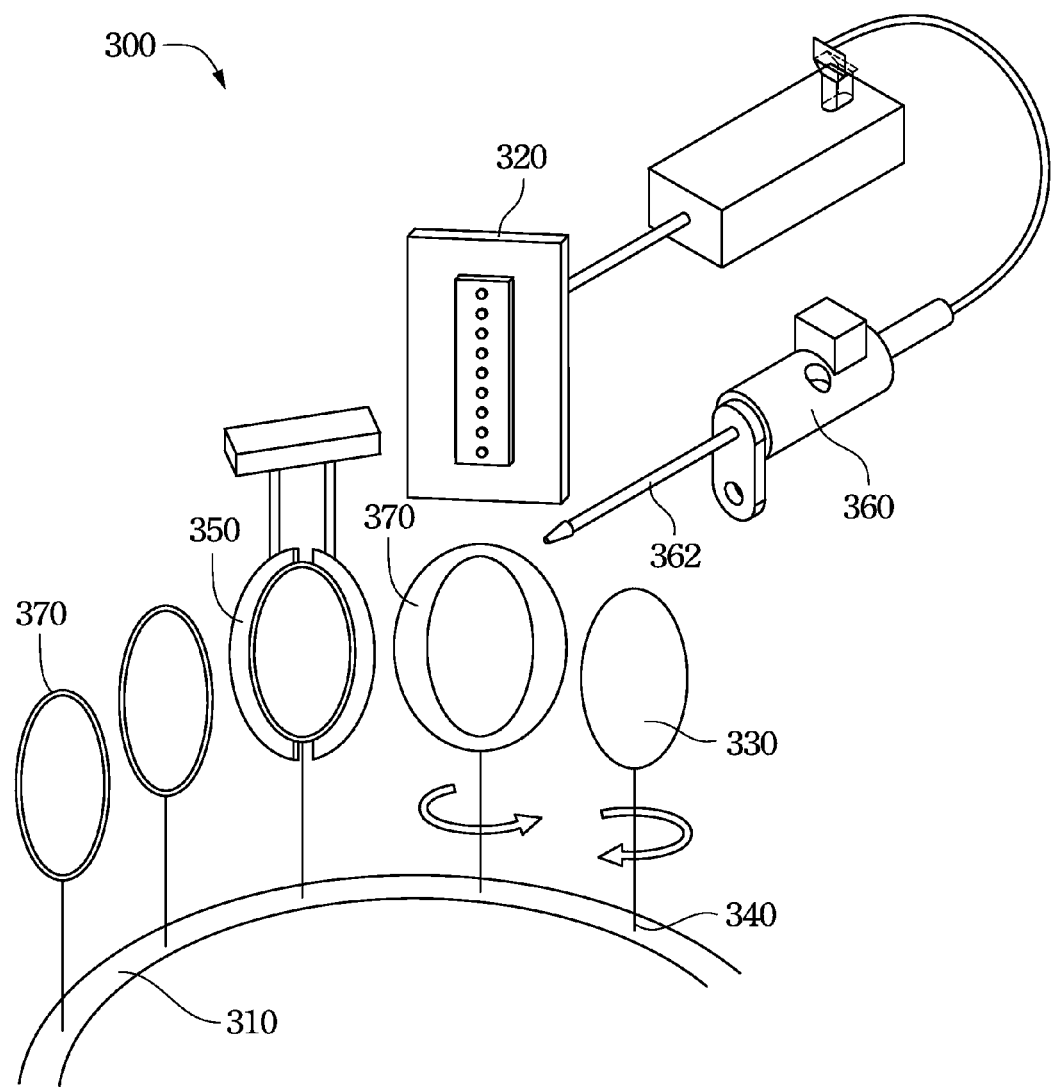
FIG. 7 is a schematic diagram of a fifth embodiment of the apparatus for fabricating three-dimensional nonwoven fabric structure of the invention.

FIG. 7 is a schematic diagram of a fifth embodiment of the apparatus for fabricating three-dimensional nonwoven fabric structure of the invention. The apparatus for fabricating three-dimensional nonwoven fabric structure 300 includes a conveyer 310, the meltblown device 320, a plurality of three-dimensional molds 330, a plurality of rotary shafts 340, the hot pressing device 350, and a fiber recycling device 360. The conveyer 310 has a predetermined convey direction. The conveyer 310 can be arranged as a cycle. The three-dimensional molds 330 are stood on the conveyer by the support of the rotary shafts 340. The three-dimensional molds 330 are rotated on the on the conveyer 310 by the rotary shafts 340. The fiber recycling device 360 is disposed near the meltblown device 320.

The three-dimensional molds 330 are rotated along a first direction, for example clockwise, before the three-dimensional molds 330 are conveyed in front of the meltblown device 320. Some unwanted fibers might be led toward the three-dimensional molds 330 when the three-dimensional molds 330 are conveyed close to the meltblown device 320. Then the three-dimensional molds 330 are rotated along a second direction, for example counterclockwise, when the three-dimensional molds 330 are conveyed in front of the meltblown device 320 to cut the unwanted fibers and collect the desired fibers. The unwanted fibers are cut when the three-dimensional molds 330 are rotated opposite to maintain the thickness uniformity.

The three-dimensional molds 330 are rotated in front of the meltblown device 320 for a predetermined time to collect the fibers spun by the meltblown device 320, and the three-dimensional nonwoven fabric structures 370 are formed on the three-dimensional molds 330. Then the three-dimensional molds 330 having the three-dimensional nonwoven fabric structures 370 thereon can be placed in the hot pressing device 350 for fixing the three-dimensional nonwoven fabric structures 370. The peel strength of the three-dimensional nonwoven fabric structures 370 can be increased by the hot pressing process provided by the hot pressing device 350.

The fiber recycling device 360 is disposed near the meltblown device 320 to recycle the superfluous part of the fibers, which are not collected by the three-dimensional molds 330. The fiber recycling device 360 includes a fiber collector 362. The fiber collector 362 is disposed opposite to the meltlown device 320, i.e. the conveyer 310 is disposed between the meltblown device 320 and the fiber collector 362. The fiber collector 362 may suck and collect the superfluous part of the fibers spun over the three-dimensional molds 330. The fiber recycling device 360 may further connect to a feeding port of the meltblown device 320. Thus the superfluous fibers collected by the fiber collector 362 can be used as the plastic material and enter the meltblown device 320 for being recycled.

The apparatus for fabricating three-dimensional nonwoven fabric structure of the present invention can be used in shoes, diving suits, masks, head covers, hats, bras, sport bras, knee protectors, wrist protector, etc. The shape of the three-dimensional mold can be regular or irregular. The material for the meltblown device can be an elastic plastic or an inelastic plastic. The material for the meltblown device can be TPU, TPE, TPR, PP, PE, PET, PTT, PBT, PLA, cellulose, PS, PA, PTFE, EMA, or EVA.

According to the disclosed embodiments, the three-dimensional mold is rotated in front of the spinner to collect the fibers spun from the meltblown device, and the three-dimensional nonwoven fabric structure is formed on the three-dimensional mold. The position and the height of the adjustable frame, the angle between the rotary shaft and the three-dimensional mold, the density of the nozzles, and the rotary speed of the three-dimensional mold are adjustable. The present invention has the sub rotary shaft or fiber collector to remove the superfluous part of the fibers. The thickness uniformity and the peel strength of the three-dimensional nonwoven fabric structure can be improved by using the apparatus for fabricating three-dimensional nonwoven fabric structure of the present invention.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for fabricating three-dimensional nonwoven fabric structure comprising:
   an adjustable frame;
   a three-dimensional mold;
   a rotary shaft connecting the three-dimensional mold and the adjustable frame and operative to rotate the three-dimensional mold in a first rotational direction relative to the adjustable frame;
   a meltblown device having a plurality of nozzles for spinning a plurality of fibers, wherein the three-dimensional mold is rotated in front of the nozzles to collect the fibers, and a three-dimensional nonwoven fabric structure is formed on the three-dimensional mold; and
   a sub rotary shaft disposed close to the rotary shaft but not disposed in close proximately to the three dimensional mold for removing a superfluous part of the fibers not collected by at least one of the three-dimensional mold and the rotary shaft, the sub rotary shaft being operative to rotate in the first rotational direction, the three-dimensional mold being positioned between the sub rotary shaft and the nozzles of the meltblown device, wherein the sub rotary shaft has an exterior surface for contacting the superfluous part of the fibers, with the exterior surface being separated from the three-dimensional mold and the three-dimensional nonwoven fabric structure thereon such that the exterior surface of the sub rotary shaft does not contact the three-dimensional nonwoven fabric structure on the three-dimensional mold during rotation of the rotary shaft.

2. The apparatus for fabricating three-dimensional nonwoven fabric structure of claim 1, wherein two largest widths of the three-dimensional mold at opposite sides of the rotary shaft are the same.

3. The apparatus for fabricating three-dimensional nonwoven fabric structure of claim 1, wherein a density of the nozzles is determined by a shape of the three-dimensional mold.

4. The apparatus for fabricating three-dimensional nonwoven fabric structure of claim 1, further comprising a hot pressing device for hot pressing the three-dimensional nonwoven fabric structure.

5. The apparatus for fabricating three-dimensional nonwoven fabric structure of claim 1, wherein the adjustable frame is configured to adjust a height and a slanting angle of the three-dimensional mold.

* * * * *